Patented Sept. 20, 1932

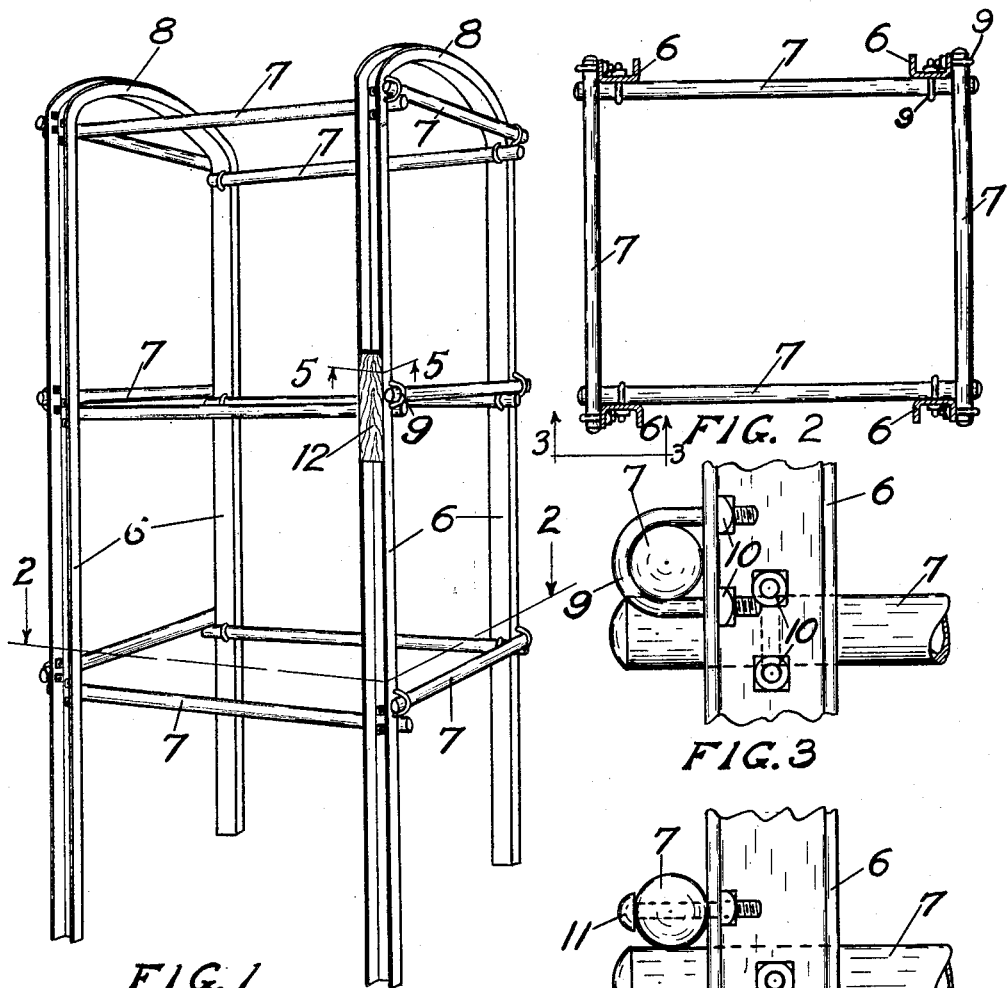

1,877,833

UNITED STATES PATENT OFFICE

DANIEL D. FERRELL, OF OTTAWA, ILLINOIS, ASSIGNOR TO J. E. PORTER CORPORATION, OF OTTAWA, ILLINOIS, A CORPORATION OF ILLINOIS

CLIMBING STRUCTURE FOR PLAYGROUNDS

Refiled for abandoned application Serial No. 384,607, filed August 9, 1929. This application filed November 3, 1930. Serial No. 493,079.

My invention relates to climbing structures to be placed in playgrounds for children to climb upon, the structures being usually placed in public playgrounds where they are available to large numbers of children. The structures employed for this purpose consist of uprights to which are secured horizontal members in such a manner that the children may climb from one horizontal member to another. Ordinarily the horizontal members are bolted onto uprights made of pipe, and held thereon by nuts placed upon the threaded end of the bolt. This manner of securing the horizontal members is objectionable for the reason that the nuts are exposed and children playing on the structure scrape against them and bruise their bodies and oftentimes tear their clothing. It is an object of my invention to eliminate these objectionable features and produce a structure wherein the nuts holding the bolts are so positioned that children cannot scrape against them or tear their clothing, thereby making a safe structure in all respects for children to play upon. My invention also consists of additional features described in the specification and set forth in the claims.

This application is a substitute for applicant's prior application bearing Serial No. 384,607.

In the drawing, Fig. 1 is a perspective view of a climbing structure embodying my invention. Fig. 2 is a transverse section on line 2—2 of Fig. 1.

Fig. 3 is an enlarged detailed view in elevation on line 3—3 of Fig. 2.

Fig. 4 is the same as Fig. 3, excepting a modified form of fastening means is shown.

Fig. 5 is an enlarged cross section on line 5—5 of Fig. 1.

Referring to the drawing, Fig. 1 shows a climbing structure containing my invention, wherein are shown uprights 6 and horizontal cross members 7 secured to the side of the upright. While the drawing shows a structure having four uprights, it will be understood that by increasing the number of uprights and lengthening the cross members the structure can be extended to any size desirable. The uprights 6 are formed with a channel extending throughout their length, and are preferably made of channel iron or U bar, and the cross members are preferably made of pipe or tubing and are spaced apart suitable distances, so that children can readily climb upon them. The uprights 6 may be connected together in pairs by arched portions 8, as shown in the drawing, but the arched portions are not essential in the use of my invention.

The cross members are secured to the uprights by means of U bolts 9, the U bolt being placed around the pipe, and the threaded ends inserted through holes in the uprights and tightly held therein by nuts 10 placed on the threaded ends of the U bolt. In this manner the cross members can be drawn close to the uprights so that they cannot turn or slide in the bolt. Fig. 5 shows a modified form of securing the cross members to the upright, wherein straight shafted bolts 11 are used in place of U bolts. The bolts 11 are inserted through holes made in the cross members and through the upright and fastened thereon by means of a nut, substantially the same manner as the U bolt.

It will be apparent that the nuts securing the bolts will be within the channel formed in the uprights and therefore out of the way, so that the outer surface of the upright is smooth and unobstructed, permitting children to play on the structure without coming in contact with the nuts on the bolts which eliminates bruises on them and avoids tearing their clothes.

If it is desired to have the nuts on the bolts holding the cross members so that they cannot be seen, a block 12, preferably made of wood, may be placed in that portion of the channel in the upright where the nuts are located. The block may be secured to the upright in any suitable manner, and for this purpose I use a screw 13. The screw is inserted through a hole in the upright, and fastened into the block 12.

Children may climb and play upon a climbing structure containing my invention with safety both to themselves and their clothing. The structure is also easily assembled by unskilled labor and makes a very desirable piece of playground equipment.

What I claim is:

1. In climbing structures for playgrounds the combination with cross bars, of uprights having a channeled recess throughout their length and bolts engaging the cross bars with the uprights having means thereon within the channeled recess of the uprights to hold the cross bars and uprights in engagement whereby the outer surface of the uprights is rendered smooth and unobstructed.

2. In climbing structures for playgrounds the combination with cross bars, of uprights having a channeled recess throughout their length, bolts engaging the cross bars with the uprights and nuts on the bolts within the channeled recess to hold the cross bars in engagement with the uprights, whereby the outer surface of the uprights is rendered smooth and unobstructed.

3. In climbing structures for playgrounds the combination with cross bars, of uprights having a channeled recess throughout their length, bolts engaging the cross bars with the uprights, nuts on the bolts within the channeled recess of the uprights to hold the cross bars in engagement with the uprights when the nuts are tightened on the bolts whereby the outer surface of the uprights is rendered smooth and unobstructed, and blocks adapted to be fitted into the channel immediately over the nuts to enclose the nuts on the open side of the channel.

In witness whereof, I have hereunto subscribed my name.

DANIEL D. FERRELL.